3,060,108
NON-CORROSIVE PLUTONIUM FUEL SYSTEMS
Arthur S. Coffinberry and James T. Waber, Los Alamos, N. Mex., assignors to the United States of America as represented by the United States Atomic Energy Commission
No Drawing. Filed July 8, 1960, Ser. No. 41,705
8 Claims. (Cl. 204—154.2)

This invention relates to nuclear fission reactor fuel systems and more particularly deals with systems using plutonium as the fissile element, such plutonium being maintained in the liquid state during operation and contained in a tantalum receptacle. The plutonium may be used substantially undiluted or may be fluxed with an inactive diluent to form a low melting point such as the Pu—Fe, Pu—Co and Pu—Ni alloys, in particular the eutectics disclosed in Chynoweth, U.S. Patent 2,890,954, the binary alloys of Coffinberry in U.S. Patent 2,867,530, and the ternary alloys of plutonium with cerium and one of the group Fe, Co, Ni and Cu disclosed by Coffinberry in U.S. Patents 2,886,504 and 2,901,345.

The chief disadvantage in the use of liquid plutonium as a reactor fuel is its corrosiveness. Although plutonium has a relatively low melting point (640° C.), it readily forms low-melting point alloys with several common metals having higher melting points, e.g., Fe, Co and Ni. Of the less common refractory metals which appear to be feasible as plutonium fuel containers, Ta is the outstanding candidate. While there appears to be relatively insignificant reaction between plutonium and tantalum when each is used in an ultra pure condition, it also appears to be impossible to obtain the required high purity in commercially available lots of such elements, in particular tantalum. Even with fairly pure tantalum, the heated plutonium fuel corrodes the container, eventually proceeding to the extent of corroding through the hottest parts of the container.

The corrosion mechanisms involved are of two types, (1) uniform solution attack of all surfaces, irrespective of grain boundaries, and (2) integranular attack, which is erratic in its occurrence and takes place only occasionally at localized grain boundaries. Mass transfer, which occurs because there are thermal gradients from one part of the container to the other, may involve either type of corrosion attack but usually proceeds in much greater degree through the mechanism of uniform solution attack. If thermal gradients could be eliminated, which appears to be virtually impossible, the tantalum of the container would go into solution with the plutonium to the extent of its limited solubility and no further action would occur. However, with such gradients and the mass movement resulting from possible convection in the liquid fuel, tantalum enters into solution with the plutonium in the hottest region, is carried to the colder regions and plates out on the container because of its smaller solubility at the lower temperature. While the plating out has no particularly harmful effect, the continuous removal of material from the hot region will eventually result in failure of the container in that area.

In contrast to such mass transfer, which is observed as a uniform process, intergranular attack is very spotty, sometimes not occurring at all in particular tantalum containers, and where observed not occurring along all grain boundaries. However, in those instances where it is observed, intergranular attack proceeds much more rapidly than the uniform solution type of corrosion. In the dynamic test to be described in more detail below, the Pu—Fe eutectic alloy with neither of the additives of the present invention corroded an uncoated tantalum container at 700° C. at rates of 11-38 mils per year by uniform solution attack, but in a number of test specimens intergranular attack has been observed to cause localized penetration of a 20-mil thickness of tantalum in 200 hours at 750° C.

It is the primary object of the present invention to provide methods and means for preventing the corrosion of a tantalum container by liquid plutonium and its alloys.

A further object is to provide methods and means for preventing the mass transfer of tantalum in a reactor system consisting essentially of a liquid plutonium containing fuel in a tantalum container.

An added object is to prevent such mass transfer in such a reactor by uniform solution corrosion.

Another object is to provide methods and means for preventing intergranular attack by liquid plutonium and its alloys on a tantalum container.

These objects are achieved in the present invention by providing in the liquid plutonium fuel an additive which reacts with the tantalum container or an element therein to form a coating which adheres to the tantalum substrate and does not react with either the liquid fuel or such substrate. An excess of such additive is provided to insure that such coating is self-healing, i.e., that cracks or other discontinuities which develop as a result of mechanical or thermal shocks will be filled in by reaction between such additive and the exposed substrate. The initial coating may, of course, be formed by any convenient process in addition to reaction between the fuel and the container; the important consideration for the purpose of the present invention being that the fuel and container have in them during the course of operation the necessary elements which react to form the same coating compound or compounds to fill the cracks or other discontinuities mentioned above.

In order to provide for the occurrence of such a coat-forming reaction, either the metallic element of the refractory coating compound may be dissolved in the liquid alloy, with the non-metallic element dissolved in tantalum, or vice versa. In the preferred embodiment, the metallic element of the refractory coating is the tantalum itself, with the non-metallic element carried in solution in the liquid fuel.

In the course of investigating such coatings, the present inventors considered compounds of tantalum with boron, carbon, nitrogen and silicon. As a preliminary step, the compatibilities of such compounds with liquid plutonium were investigated. The nitrides were quickly ruled out on thermodynamic considerations and preliminary experiments. Good boride coatings composed of successive layers of $Ta_2B$, $TaB$ and $Ta_3B_4$ were formed, but reacted extensively with the liquid plutonium alloys. Similar tests with carbide coatings composed of $Ta_2C$ and $TaC$ did not so react with liquid plutonium alloys, nor did silicide coatings of $Ta_2Si$ and $TaSi_2$.

As the result of these preliminary tests, static tests of the carbide and silicide coatings were made by dissolving carbon and silicon in liquid plutonium or plutonium alloys held in uncoated tantalum containers. In one such test the liquid fuel consisted of 2 weight percent carbon, balance plutonium. By means of resistance heating a 25-gram charge of this alloy was held in vacuum at 1000° C. for 30 hours in a previously unlined tantalum crucible. At the end of this time the charge was poured out and the crucible was cooled to room temperature. Metallographic and X-ray examination disclosed a 10 micron coating composed of a mixture of tantalum carbides, $Ta_2C$ and $TaC$, and no dissolution of the tantalum by the liquid fuel.

The alloy for the above test, and those set forth below, were prepared by one of two methods, arc melting or induction heating. In the former, the individual constituents of the alloy are added in chunk form in one of the recesses in a water cooled copper hearth, preferably with a low pressure inert gas atmosphere. A non-consumable tungsten electrode is lowered close to the chunks of metal and an arc is struck to commence melting. Homogeneity is obtained by stirring the molten mass during the course of heating with the arc by methods well known to the art. The induction heating technique used involves adding the constituents to a ceramic crucible placed inside an evacuated silica tube, preferably placing the lowest density material at the bottom of the crucible and adding the other constituents in the order of increasing density. A current concentrator is preferably used around the crucible and inside the silica tube to increase the coupling between the charge and the induction coil surrounding the silica tube. As is well known in the art, turbulent stirring action resulting from this type of heating insures thorough melting of the constituents and homogeneity in the resulting alloy.

It might be mentioned that in forming the Pu—Fe—C alloys disclosed herein a superior method is disclosed in the co-pending application of Herrick, S.N. 24,625. It has been found to be extremely difficult to form such alloys by conventional techniques such as resistance heating, because when such methods are attempted the carbon agglomerates and refuses to go into solution. Herrick's technique involves melting the plutonium and iron together in a graphite crucible for a sufficient time to absorb the desired amount of carbon, or, in the alternative, incorporating the desired amount of carbon with a part of the iron as iron carbide and thereafter melting such carbide together with the required iron balance and plutonium in a refractory crucible. This method can not be applied to most of the other plutonium base alloys mentioned above, as the fluxing constituents thereof (Ni, Co and Cu) do not form carbides.

In an experiment similar to that discussed above for a carbon additive, an alloy consisting essentially of 20 atomic percent silicon, balance plutonium, was held at 1000° C. under vacuum for 30 hours in a previously unlined tantalum crucible. Metalographic examination of the cooled crucible revealed a well defined 5 micron coating consisting mostly of $Ta_2Si$ and no tantalum dissolution by the plutonium. The same alloy held at 800° C. for 1000 hours (a static test) formed a coating on the tantalum base 2 microns in thickness.

In the experiments described above, the entire tantalum crucible was maintained at a constant uniform temperature. The results of the test made it clear that either carbon or silicon may be added to a plutonium base fuel to form a carbide or silicide coating on the tantalum which is self-healing in nature. To establish the full value of such additives, dynamic tests were then made to establish the effectiveness thereof under conditions as nearly identical to reactor operating conditions as possible. In such tests, the fuel was prepared by one of the methods described above and charged into a tantalum capsule ½-inch in diameter by 5 inches long by 20 mil wall thickness. Each charge was approximately 50 grams in weight and filled the tantalum capsule to ¼ to ⅓ of its height. Such capsule was evacuated and sealed, and was suspended symmetrically inside a stainless steel cartridge 1 inch in diameter by 5 1/16 inches long in inside dimensions, the gap between capsule and cartridge being filled with liquid sodium. A resistance heater was wound around one end of the stainless steel cartridge and power was applied thereto so that one end of the tantalum capsule was heated to 700–750° C. during the course of the experiments, the temperature decreasing to a minimum of 500–550° C. at the opposite end of the capsule. This assembly was disposed vertically in a rocking mechanism designated "TiPu" (tipping plutonium) which operated on a 12 minute cycle. During the first 6-minute half cycle, the cartridge stood with the hotter end at the top. During the first 15 seconds of the second half cycle, the cartridge was inverted (rotated 180°) so that the hotter end of the cartridge was brought to the bottom. During the balance of this half cycle, the hotter end remained at the bottom, after which the first 15 seconds of the second cycle were occupied in returning the cartridge to its starting position, etc.

In these tests, the alloy used was the 9.5 atomic percent iron, balance plutonium, eutectic. Various amounts of carbon, silicon and both carbon and silicon were added for individual tests. Each test continued for about 250 hours. In an effort to observe any mass transfer occurring during the progress of the experiment, a small radioactive tantalum foil was placed inside the tantalum capsule. The foil was attached to the hotter end of the capsule, and contained the gamma-emitting isotope $Ta^{182}$. A collimated gamma detector was disposed outside and adjacent to the rocking apparatus to detect and read the level of gamma activity, such apparatus being moved up and down to scan the entire capsule during operation. In this manner any of the radioactive isotope transferred to other parts of the capsule would be detected by a decrease in the foil activity and an increase in the activity at the cold end of the capsule.

In the tests in which carbon was the only additive, six tests were made containing, in parts per million, 500, 800, 900, 1000, 1700 and 2000 p.p.m. (by weight) of carbon. The mass transfer in each instance was no more than 0.25 mil per year, the limit of sensitivity of the gamma detector. This corrosion rate is quite low and tolerable in the system involved. The capsules were examined metallographically and found to contain adherent carbide coatings on the tantalum base. Such coatings were less than 1 micron in thickness, but nevertheless constituted effective barriers to prevent mass transfer by the liquid fuel, even with the thermal gradients and fuel circulation imposed by the conditions of the experiment. It was obvious that the thickness of the carbide layer is essentially independent of the quantity of carbon dissolved in the fuel, as little as 500 p.p.m. being sufficient both to form the coating and to insure its integrity by self-healing—even with the rather unfavorable surface-to-volume ratio imposed by the geometry of the test capsule.

Three experiments were performed in which silicon was the only additive to the Pu—Fe eutectic alloy. The coatings formed were considerably thicker, ranging from 5–20 microns and increasing with the amount of silicon available in the fuel, the latter being 560, 1360 and 5000 p.p.m. A correlation was also found between the mass transfer rate and the quantity of silicon in the fuel, increasing for the three silicon additions from 0.4 mil per year to 1.8 mils per year to 9 mils per year. The first two rates are tolerable, but the last is much too rapid for safety, approaching the corrosion rate of plutonium with no additive. However, analysis of the cooled capsule disclosed spalling of the thick coating rather than actual mass transfer of the underlying tantalum. It was apparent that these coatings are undesirable in that, with increasing thickness, they became increasingly subject to spalling.

Further analysis of both type coatings disclosed, on the one hand, that the thin carbide coatings are superior in preventing uniform solution attack, but are not overly effective in arresting intergranular attack, whereas the thicker silicide coatings are very effective in almost completely eliminating intergranular attack. It became apparent that, where both types of corrosion are to be expected, the optimum additive is the combination of both carbon and silicon. Many further tests similar to those described above were made with such a double additive, various cast irons being used for convenience because they made it possible to add both the iron to the plutonium to form the Pu—Fe eutectic and the protective additives simultaneously. As the results of these experiments, it was found that both uniform solution attack and intergranular attack may be effectively prevented by a minimum carbon addition of 200–300 p.p.m. and a minimum silicon addition of 500–600 p.p.m. In dynamic tests of such alloys as described above, the mass transfer rate was no more than 0.25 mil per year, and no intergranular penetration could be detected. It was further observed that when both carbon and silicon additives were present the resulting coating did not grow to the great thickness, undesirable from the standpoint of spalling, which was observed when a large silicon addition was used alone.

While the tests described above are limited to those in which the protective elements are added to only pure plutonium and to Pu—Fe alloys, it is apparent that they will serve the same function in the other alloys mentioned above because of the similar chemical behavior of the diluent elements of such alloys. Of the various fluxing or diluent elements mentioned, only iron and cerium form carbides, and the silicides of cobalt, nickel and copper are much less stable than the tantalum silicides; hence the presence of these three elements can not prevent or hinder the formation of the tantalum carbides and silicides. The above summarized experiments demonstrate that iron does not interfere with the formation of tantalum carbide and tantalum silicide coatings.

Experiments were performed which demonstrated that both the silicides and carbides of tantalum can be formed by adding carbon and silicon to liquid cerium in a tantalum container. In one such test an alloy of 2 weight percent carbon in cerium was held in a tantalum crucible for 26 hours at 1000° C., resulting in a 5 micron coating of tantalum carbides and no dissolution of the tantalum substrate by the liquid metal. Hence, since both carbide and silicide coatings can be formed equally well with either liquid cerium or liquid plutonium serving as the solvent for the additive, it is seen that satisfactory coatings will also form if carbon and/or silicon are added to any composition of plutonium-cerium binary liquid alloy or to any ternary liquid alloy composed of plutonium and cerium together with a fluxing amount of a metal in the class Fe, Co, Ni and Cu.

In the alloys described, the minimum amounts of additives have been dealt with in some detail because it is desirable not to dilute the fuel to the extent that the additive acts as a moderator. The maximum is largely a matter of choice, insofar as carbon is concerned, the inventors preferring to limit the carbon to not more than about 1 weight percent of the alloy. When silicon is used as the only additive, it is preferable to limit the maximum addition to about 5000 parts per million of the fuel to which it is added, to prevent a too rapid build up in the silicide coating thickness and subsequent spalling. When both additives are used together there is little to be gained by a carbon content greater than 1000 p.p.m. but the silicon content may be increased to 1 weight percent without risking the formation of an unduly thick coating.

What is claimed is:

1. In a nuclear fission reactor utilizing a liquid fuel containing plutonium as the fissile element and a tantalum container for said fuel, the combination with said fuel of an additive consisting of carbon and silicon which additive reacts with the tantalum container surface material to form a coating that is self-healing and the said additive contains at least 500 parts of silicon per million parts of said fuel.

2. The fuel of claim 1 in which said additive consists of 200 to 1000 parts of carbon per million parts of said fuel and silicon from a minimum of 500 parts per million parts of said fuel to 1 weight percent of said fuel.

3. The fuel of claim 2 containing 200 to 300 parts per million carbon and 500 to 600 parts per million silicon.

4. A surface coat forming and healing reactor fuel for use in tantalum containers consisting essentially of a eutectic alloy of plutonium and iron and an additive consisting of carbon and silicon and the said additive contains at least 500 parts of silicon per million parts of said fuel.

5. The fuel of claim 4 in which said additive consists of 200 to 1000 parts of carbon per million parts of said fuel and silicon from a minimum of 500 parts per million parts of said fuel to 1 weight percent of said fuel.

6. The fuel of claim 5 containing 200 to 300 parts per million carbon and 500 to 600 parts per million silicon.

7. An improved plutonium reactor liquid fuel for utilization in a nuclear reactor having a tantalum fuel containment vessel consisting essentially of a diluent selected from the class consisting of iron, cobalt, nickel, cerium, cerium-iron, cerium-cobalt, cerium-nickel, and cerium-copper, an additive consisting of carbon and silicon, the balance plutonium and the said additive reacts with the tantalum container surface material to form a coating that is self-healing and the said additive contains at least 500 parts of silicon per million parts of said fuel.

8. The fuel of claim 7 in which said diluent is selected from the class consisting of iron, cobalt, nickel and in which said additive consists of from 200 to 300 parts of carbon per million parts of said fuel and silicon from a minimum of 500 parts per million parts of said fuel to a maximum of 1 weight percent of said fuel.

References Cited in the file of this patent

UNITED STATES PATENTS 2,864,731     Gurinsky et al. _____ Dec. 16, 1958
2,890,954     Chynoweth _____ June 16, 1959

OTHER REFERENCES

Atomics, May 1957, pages 168–171.

AEC Document BMI–1340, May 1, 1959, pp. 81–86, available from Office of Technical Services, U.S. Dept. of Commerce, Washington 25, D.C.

Nuclear Science Abstracts, vol. 13, Jan.–Feb. 1959, abstract No. 191, page 24.

"Proceedings of the 1957 Fast Reactor Information Meeting," held at Chicago, Ill., Nov. 20–21, 1957, pp. 5, 6, 108–117 and 239.

BMI–1324, Mar. 1, 1955, pp. 59–62, available BMI 1340.